United States Patent
Karaki et al.

(10) Patent No.: US 9,481,847 B2
(45) Date of Patent: Nov. 1, 2016

(54) ULTRAVIOLET CURABLE RESIN COMPOSITION, SLIDING MEMBER, AND METHOD FOR PRODUCING SLIDING MEMBER

(71) Applicant: MINEBEA CO., LTD., Kitasaku-gun, Nagano (JP)

(72) Inventors: Tadahiko Karaki, Tomi (JP); Kunihiro Matsumoto, Komoro (JP); Koichiro Sagiyama, Chiba (JP)

(73) Assignee: MINEBEA CO., LTD., Kitasaku-gun, Nagano (JP)

( * ) Notice: Subject to any disclaimer, the term of this patent is extended or adjusted under 35 U.S.C. 154(b) by 0 days.

(21) Appl. No.: 14/523,017

(22) Filed: Oct. 24, 2014

(65) Prior Publication Data

US 2015/0051123 A1 Feb. 19, 2015

Related U.S. Application Data

(63) Continuation of application No. PCT/JP2013/056470, filed on Mar. 8, 2013.

(30) Foreign Application Priority Data

Apr. 26, 2012 (JP) .................. 2012-101417
Oct. 16, 2012 (JP) .................. 2012-229165

(51) Int. Cl.
*C10M 107/42* (2006.01)
*F16C 17/02* (2006.01)
(Continued)

(52) U.S. Cl.
CPC .............. *C10M 107/42* (2013.01); *C08F 2/48* (2013.01); *C08F 114/26* (2013.01);
(Continued)

(58) Field of Classification Search
CPC ........... C10M 107/42; C10M 125/26; C10M 125/28; C08F 2/48; C08F 114/26; C08F 226/06; C08F 2220/343; C09J 4/06; F16C 17/02; F16C 17/12; F16C 23/045; F16C 33/00208; F16C 43/02; F16C 2208/32; F16C 2208/58; F16C 2223/30; F16C 2226/52
USPC ........................ 508/106, 181, 257
See application file for complete search history.

(56) References Cited

U.S. PATENT DOCUMENTS 4,526,920 A    7/1985    Sakashita et al.
5,439,957 A *   8/1995    Takimoto ................. C09D 5/08
                                                          106/14.14

(Continued)

FOREIGN PATENT DOCUMENTS

EP          0 538 815 A1    4/1993
JP         A-2003-186225    7/2003

(Continued)

OTHER PUBLICATIONS

May 12, 2015 Office Action issued in Japanese Application No. 2014-512402.

(Continued)

*Primary Examiner* — James Goloboy
(74) *Attorney, Agent, or Firm* — Oliff PLC

(57) ABSTRACT

There is provided a resin composition for a machinable liner of a sliding member. An ultraviolet curable resin composition for a self-lubricating liner contains a (meth)acrylate compound having an isocyanuric acid ring represented by the following formula and PTFE as a solid lubricant. In the formula (1), X is a group which contains an acryloyl group and is composed only of C, H, and O. Y and Z are groups each composed only of C, H, and O. PTFE is contained in an amount of 10 to 50% by weight with respect to a total amount of the ultraviolet curable resin composition. The ultraviolet curable resin composition is suitable for a self-lubricating liner 24 of a spherical bearing 20 having an outer race 22 and an inner race 26.

(1)

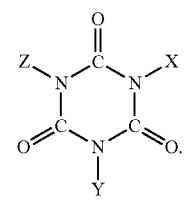

19 Claims, 4 Drawing Sheets

(51) Int. Cl.
*C10M 125/26* (2006.01)
*C10M 125/28* (2006.01)
*F16C 33/00* (2006.01)
*C08F 114/26* (2006.01)
*F16C 33/20* (2006.01)
*F16C 17/12* (2006.01)
*F16C 43/02* (2006.01)
*C08F 2/48* (2006.01)
*C08F 226/06* (2006.01)
*C08F 220/34* (2006.01)
*F16C 23/04* (2006.01)
*C09J 4/06* (2006.01)

(52) U.S. Cl.
CPC ........... *C08F 226/06* (2013.01); *F16C 17/12* (2013.01); *F16C 33/00* (2013.01); *F16C 33/201* (2013.01); *F16C 33/208* (2013.01); *F16C 43/02* (2013.01); *C08F 2220/343* (2013.01); *C09J 4/06* (2013.01); *C10M 125/26* (2013.01); *C10M 125/28* (2013.01); *C10M 2201/105* (2013.01); *C10M 2201/12* (2013.01); *C10M 2213/0623* (2013.01); *C10M 2215/305* (2013.01); *F16C 17/02* (2013.01); *F16C 23/045* (2013.01); *F16C 2208/32* (2013.01); *F16C 2208/58* (2013.01); *F16C 2208/72* (2013.01); *F16C 2223/30* (2013.01); *F16C 2226/52* (2013.01)

(56) References Cited

U.S. PATENT DOCUMENTS

| | | | | |
|---|---|---|---|---|
| 5,462,687 A * | 10/1995 | Podszun | ................... | C08J 3/09 252/572 |
| 5,898,041 A * | 4/1999 | Yamada | ................ | C09J 163/10 349/122 |
| 6,180,574 B1 | 1/2001 | Ryan et al. | | |
| 2007/0223850 A1 | 9/2007 | Lopes et al. | | |
| 2011/0262059 A1 | 10/2011 | Karaki et al. | | |
| 2011/0287190 A1 | 11/2011 | Bulluck | | |
| 2012/0058923 A1* | 3/2012 | Hamel | ................... | C09D 4/00 508/106 |
| 2012/0103183 A1* | 5/2012 | Jung | ................... | C09D 161/06 92/172 |
| 2012/0294557 A1 | 11/2012 | Soelch et al. | | |
| 2014/0050859 A1 | 2/2014 | Soelch et al. | | |

FOREIGN PATENT DOCUMENTS

| | | | | |
|---|---|---|---|---|
| JP | A-2007-255712 | | 10/2007 | |
| JP | 2010100736 A | * | 5/2010 | ............... C09D 4/00 |
| JP | A-2010-100736 | | 5/2010 | |
| JP | 2011-119013 A | | 6/2011 | |
| JP | A-2011-247408 | | 12/2011 | |
| JP | 2014-516098 A | | 7/2014 | |
| SG | 182791 A1 | | 9/2012 | |
| WO | 2011/092884 A1 | | 8/2011 | |
| WO | 2013/008902 A1 | | 1/2013 | |

OTHER PUBLICATIONS

International Search Report issued in PCT/JP2013/056470 mailed Jun. 11, 2013 (with translation).
Sep. 14, 2015 extended European Search Report issued in European Application No. 13781754.0.
Jan. 4, 2016 Office Action issued in Chinese Application No. 201380022048.6.
Nov. 20, 2015 Office Action issued in Canadian Application No. 2,871,576.
Apr. 28, 2016 Office Action issued in European Application No. 13781754.0.

* cited by examiner

ULTRAVIOLET CURABLE RESIN COMPOSITION, SLIDING MEMBER, AND METHOD FOR PRODUCING SLIDING MEMBER

CROSS REFERENCE TO RELATED APPLICATION

This application is a Continuation Application of International Application No. PCT/JP2013/056470 which was filed on Mar. 8, 2013 claiming the conventional priority of Japanese patent Applications No. 2012-101417 filed on Apr. 26, 2012 and No. 2012-229165 filed on Oct. 26, 2012.

BACKGROUND OF THE INVENTION

1. Field of the Invention

The present invention relates to an ultraviolet curable resin composition for forming a self-lubricating liner of a sliding member such as an unlubricated sliding bearing and a reamer bolt, a sliding member provided with the self-lubricating liner, and a manufacturing method for producing the sliding member.

2. Description of the Related Art

A sliding bearing in which a shaft of rotary motion or translational motion is held by a sliding surface has been widely used. In particular, an unlubricated sliding bearing using no lubricating oil for a sliding surface has been used for applications requiring low friction coefficient, high durability, high load capacity, high heat resistance, high oil resistance, and the like, such as vessel or ship application and aircraft application.

As the unlubricated sliding bearing, Patent Literature 1 (Japanese Patent Application Laid-open No. 2007-255712) discloses a spherical bearing for high-load application including an outer race member having a concave first bearing surface and an inner race member having a convex second bearing surface slidably movable relative to the first bearing surface. In the spherical bearing, one of the outer race member and the inner race member is made of titanium alloy which has a bearing surface made of titanium nitride formed on the titanium alloy surface by a physical vapor deposition method (PVD). The bearing surface of the other member includes a self-lubricating liner made from resin. The self-lubricating liner is composed of a fabric including fibers of polytetrafluoroethylene (PTFE) and polyaramid. The fabric is saturated with a phenol resin composition.

Patent Literature 2 (U.S. Pat. No. 6,180,574) discloses a self-lubricating coating composed of a thermosetting acrylic composition in which dipentaerythritol pentaacrylate is contained in an amount of 20% by weight or more and a solid lubricant such as polytetrafluoroethylene is contained in an amount of 10% by weight or more with respect to the total amount of the thermosetting acrylic composition. 20% by weight or more of triethylene glycol dimethacrylate and 1% by weight or less of aramid pulp may be added to the self-lubricating coating. Patent Literature 2 (U.S. Pat. No. 6,180,574) also discloses a sleeve bearing in which the self-lubricating coating is applied, as a liner, on an inner circumferential surface of an outer race.

Patent Literature 3 (Japanese Patent Application Laid-open No. 2011-247408) filed by the applicant of the present application discloses a sliding bearing suitable for aircraft application and the like. The sliding bearing includes a self-lubricating liner formed on a sliding surface of the sliding bearing, and the self-lubricating liner is composed of a self-lubricating resin composition obtained by mixing 60% by weight to 80% by weight of polyether ketone resin, 10% by weight to 30% by weight of PTFE, 5% by weight to 15% by weight of carbon fiber, and 15% by weight or less of aramid fiber. The total amount of the carbon fiber and the aramid fiber is 10% by weight to 25% by weight in the self-lubricating resin composition. A metal surface on which the self-lubricating liner is formed has a surface roughness Ra (average centerline roughness) of 4.0 µm or more and an Rmax (maximum height) of 30.0 µm or more.

The unlubricated sliding bearings disclosed in Patent Literatures 1 to 3 are used by being incorporated into the aircraft and the like, and thus they are required to have low friction coefficient, high load capacity, heat resistance, oil resistance, and the like. Further, there is a demand from airframe manufacturers such that a fitting adjustment can be performed by adjusting the size of a sliding surface of a sliding bearing through grinding or cutting in an assembling step of the sliding bearing such as the sleeve bearing, instead of performing the size adjustment of a shaft.

However, in the case of the fibrous lubricating liner described in Patent Literature 1 (Japanese Patent Application Laid-open No. 2007-255712), it is not possible to perform the size adjustment through the grinding or the cutting because, if it is subjected to such a posterior processing, the fibers of the lubricating liner will be cut and the lubricating liner will not function as a liner any longer.

The self-lubricating coating described in Patent Literature 2 (U.S. Pat. No. 6,180,574) is based on thermosetting acrylic resin, and thus it takes time to cure. This brings such a problem that the productivity thereof is low. Further, if an attempt is made to handle the thermosetting acrylic resin in an uncured condition in order to save time, the uncured resin flows and the shape of self-lubricating coating cannot be maintained. Thus, it is difficult to handle the self-lubricating coating based on the thermosetting acrylic resin.

The self-lubricating liner described in Patent Literature 3 (Japanese Patent Application Laid-open No. 2011-247408) is based on the polyether ketone resin which is thermoplastic resin, and thus it can be produced by an injection molding method achieving high productivity. However, in order to improve the adhesion of the liner to the inner circumferential surface of the outer race, it is required that a shot blasting process for roughening the surface roughness of the inner circumferential surface of the outer race be performed beforehand. Further, in a case that PTFE is blended as a solid lubricant with the thermoplastic resin such as the polyether ketone resin, PTFE is required to be blended in an amount of less than 30% by weight with respect to the total amount of the thermoplastic resin. The reason thereof is as follows. During the kneading of resin and the injection molding, PTFE generates decomposition gas because it is heated to its melting point or more by being exposed to high temperature and high pressure. From the viewpoint of safety, it is required that such decomposition gas be prevented from being generated. Accordingly, the addition amount of PTFE should be limited. On the other hand, in order to improve the lubricating property of the liner, it is desirable that the addition amount of PTFE be increased.

Under the above circumstances, there is a demand for a resin composition for a self-lubricating liner which can ensure a sufficient addition amount of PTFE, can be handled easily during manufacturing steps, and requires no process for roughening the base surface.

The present invention has been conceived to solve the foregoing problems. An object of the present invention is to provide a resin composition for forming a self-lubricating liner having low friction coefficient, high durability, high load capacity, high heat resistance and high oil resistance, as well as being capable of performing a size adjustment through grinding or cutting after the curing of resin and requiring no process for roughening a base surface, and also to provide a resin composition which can be handled easily in manufacturing steps. Another object of the present invention is to provide a sliding member with the self-lubricating liner composed of the resin composition.

SUMMARY OF THE INVENTION

According to a first aspect of the present invention, there is provided an ultraviolet curable resin composition for a self-lubricating liner, comprising:

a (meth)acrylate compound having an isocyanuric acid ring represented by formula (1):

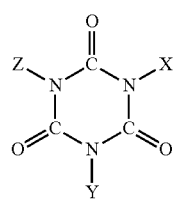

(1)

in the formula (1), X is a group which contains an acryloyl group and is composed only of C, H, and O, and Y and Z are groups each composed only of C, H, and O; and a polytetrafluoroethylene resin as a solid lubricant, wherein the (meth)acrylate compound having the isocyanuric acid ring is contained in an amount of 20% by weight to 90% by weight and the polytetrafluoroethylene resin is contained in an amount of 10% by weight to 50% by weight with respect to a total amount of the ultraviolet curable resin composition.

In the ultraviolet curable resin composition related to the present invention, it is preferred that the (meth)acrylate compound having the isocyanuric acid ring represented by the formula (1) be any of di-(2-(meth)acryloxyethyl) isocyanurate, tris-(2-(meth)acryloxyethyl) isocyanurate, and ε-caprolactone modified tris-(2-acryloxyethyl) isocyanurate, or a mixture of the di-(2-(meth)acryloxyethyl) isocyanurate and the tris-(2-(meth)acryloxyethyl) isocyanurate.

The ultraviolet curable resin composition related to the present invention may further contain melamine cyanurate in an amount of 30% by weight or less with respect to the total amount of the ultraviolet curable resin composition.

In the ultraviolet curable resin composition related to the present invention, the polytetrafluoroethylene resin may be in a powder form having an average particle diameter ranging from 75 μm to 180 μm. Further, the polytetrafluoroethylene resin may be a polytetrafluoroethylene resin surface-treated by epoxy modified acrylate. The polytetrafluoroethylene resin may be contained in an amount of 30% by weight to 50% by weight with respect to the total amount of the ultraviolet curable resin composition. In the ultraviolet curable resin composition related to the present invention, a thermosetting agent, a chemical-resisting agent such as bisphenol A-type epoxy acrylate, an adhesiveness improver such as hydroxyethyl(meth)acrylate or isobornyl (meth)acrylate, a curing accelerator such as pentaerythritol triacrylate and dipentaerythritol hexa(meth)acrylate, a toughness-applying agent such as urethane acrylate, a cross-linking promoter such as ethylene glycol di(meth)acrylate, fumed silica, and glass fiber may be further contained individually or in combination.

According to a second aspect of the present invention, there is provided a sliding member comprising a self-lubricating liner which is formed on a sliding surface of the sliding member and is made of the ultraviolet curable resin composition related to the present invention. The sliding member may be a sliding bearing or a spherical bearing. The sliding member may be a bolt including a head portion, a shaft portion, a thread portion, and the self-lubricating liner formed on an outer circumferential surface of the shaft portion.

According to a third aspect of the present invention, there is provided a manufacturing method for producing a sliding member, comprising: applying an ultraviolet curable resin composition on a sliding surface of the sliding member; and curing the ultraviolet curable resin composition by irradiation with ultraviolet rays to form a self-lubricating liner, wherein the ultraviolet curable resin composition contains a (meth)acrylate compound having an isocyanuric acid ring represented by the above formula (1) and a polytetrafluoroethylene resin as a solid lubricant; and the (meth)acrylate compound having the isocyanuric acid ring is contained in an amount of 20% by weight to 90% by weight and the polytetrafluoroethylene resin is contained in an amount of 10% by weight to 50% by weight with respect to a total amount of the ultraviolet curable resin composition.

The manufacturing method for producing the sliding member can further include a step of performing cutting or grinding of the self-lubricating liner to make the self-lubricating have a desired size.

In the manufacturing method for producing the sliding member, the ultraviolet curable resin composition may further contain a thermosetting agent; the sliding member may be a spherical bearing including an outer race member (outer ring member) which has a concave first bearing surface and an inner race member (inner ring member) which has a convex second bearing surface slidably movable on the first bearing surface; and the self-lubricating liner may be formed by: applying the ultraviolet curable resin composition on the first bearing surface or the second bearing surface as the sliding surface; curing the ultraviolet curable resin composition applied on the first bearing surface or the second bearing surface into a state of semi-cured by irradiation with the ultraviolet rays; inserting the inner race member into the outer race member after the ultraviolet curable resin composition is semi-cured; pressing the outer race member to cause plastic deformation so as to make the outer race member follow the convex second bearing surface of the inner race member; and curing the ultraviolet curable resin composition completely by heat after the plastic deformation. In the manufacturing method for producing the sliding member, the ultraviolet curable resin composition may be applied on the sliding surface without roughening the sliding surface.

The ultraviolet curable resin composition related to the present invention is applied on the sliding surface, and then it can be cured in a short time by an ultraviolet irradiation. Since high temperature/high pressure conditions as when thermoplastic resin is used are not necessary, a relatively large amount of polytetrafluoroethylene resin can be added, which makes it easy to handle the parts. Further, since the adherence of the cured resin composition to an application-target surface (base surface) is extremely strong, a process for roughening the application-target surface previously is not necessary. Accordingly, the safety of work and power saving can be improved and equipment cost can be lowered.

Furthermore, since the cured resin composition can be subjected to cutting or grinding easily, it is possible to provide a machinable liner which can be subjected to after-processing such as a size adjustment. The manufacturing method for producing the sliding member related to the present invention is capable of easily manufacturing bearings such as a reamer bolt and a spherical bearing with a self-lubricating liner formed on a sliding surface of an outer race member or an inner race member, at low cost with high precision.

DESCRIPTION OF THE PREFERRED EMBODIMENTS

In the following, an explanation will be made about an ultraviolet curable resin composition related to the present invention and a sliding member with a self-lubricating liner made from the ultraviolet curable resin composition.

<Sliding Member>

Figure 1A:
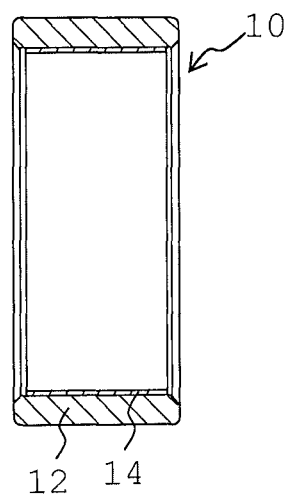
FIG. 1A is a longitudinal sectional view of a sleeve bearing according to an embodiment of the present invention cut along an axial direction of the sleeve bearing.
Figure 1B:
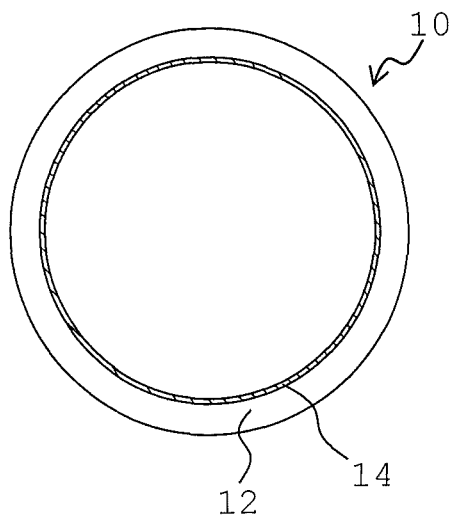
FIG. 1B is a lateral sectional view of the sleeve bearing cut along a direction perpendicular to the axis.

At first, an exemplary sliding member including the self-lubricating liner made from the ultraviolet curable resin composition related to the present invention will be explained while referring to FIGS. 1A and 1B. A sleeve bearing 10 shown in FIGS. 1A and 1B includes a cylindrical outer race member 12 which is made of metal such as bearing steel, stainless steel, duralumin material, and titanium alloy and a self-lubricating liner layer 14 which is formed on an inner circumferential surface of the outer race member 12. The self-lubricating liner layer 14 is formed by applying the ultraviolet curable resin composition related to the present invention which will be described below on the inner circumferential surface of the outer race member 12 and then curing the applied ultraviolet curable resin composition. The size adjustment of self-lubricating liner can be easily performed by grinding or cutting, and thus the self-lubricating liner may be referred to as a "machinable liner" (processable liner) as appropriate. The sliding member includes not only a sleeve bearing used for rotary motion or translational (linear) motion but also various sliding members such as a spherical bearing and a reamer bolt which will be described later. These sliding members are also included in an object of the present invention.

<Ultraviolet Curable Resin Composition>

The ultraviolet curable resin composition contains (meth)acrylate having an isocyanuric acid ring represented by the following formula (1) as a component mainly composing the resin.

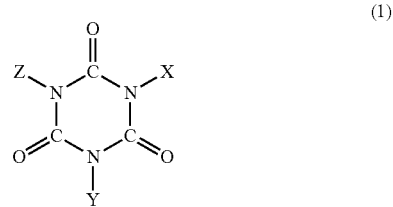

(1)

In the formula (1), X is a group which contains an acryloyl group and is composed only of C, H, and O. Y and Z are groups each composed only of C, H, and O. Y and Z may or may not contain the acryloyl group. It is preferred that X be an acryloxyethyl group or an acryloxyethyl group modified by ε-caprolactone. It is preferred that Y and Z be the same group as X. In the present invention, a term "(meth)acrylate" means acrylate or methacrylate.

The (meth)acrylate having the isocyanuric acid ring represented by the formula (1) (hereinafter simply referred to as the (meth)acrylate having the isocyanuric acid ring) has satisfactory heat resistance in addition to the ultraviolet curing property, and thus it is preferably used for a self-lubricating liner of sliding members and the like. In particular, the sliding member incorporated into the aircraft is required to have the heat resistance of 163 degrees Celsius or more, and even in such a case, the (meth)acrylate having the isocyanuric acid ring is preferably used.

It is preferred that the (meth)acrylate having the isocyanuric acid ring be capable of being applied on a sliding surface as a composition and be capable of forming a self-lubricating liner which is less likely to wear after curing. From this viewpoint, as the (meth)acrylate having the isocyanuric acid ring, bis(acryloyloxyethyl) hydroxyethyl isocyanurate, di-(2-(meth) acryloxyethyl) isocyanurate, tris-(2-(meth)acryloxyethyl) isocyanurate, ε-caprolactone modified tris-(2-acryloxyethyl) isocyanurate, and the like are preferably used. The above examples of the (meth)acrylate having the isocyanuric acid ring may be used individually or combining two or more kinds. Especially, any of di-(2-(meth) acryloxyethyl) isocyanurate, tris-(2-(meth)acryloxyethyl) isocyanurate, and ε-caprolactone modified tris-(2-acryloxyethyl) isocyanurate is preferably used, or a mixture of di-(2-(meth) acryloxyethyl) isocyanurate and tris-(2-(meth)acryloxyethyl) isocyanurate is preferably used.

The (meth)acrylate having the isocyanuric acid ring is contained in an amount of 20% by weight to 90% by weight with respect to a total amount of the resin composition related to the present invention, and especially the (meth)acrylate having the isocyanuric acid ring may be contained in an amount of 30% by weight to 70% by weight. In a case that the content of the (meth)acrylate having the isocyanuric acid ring is less than 20% by weight, the fluidity of resin is insufficient. This makes the application of the resin composition difficult, and further the strength of the liner is liable to be inadequate. In a case that the content of the (meth)

acrylate having the isocyanuric acid ring exceeds 90% by weight, the lubricating property is liable to decrease due to a lower content of a solid lubricant which will be described later.

In addition to the (meth)acrylate having the isocyanuric acid ring, hydroxyethyl(meth)acrylate, hydroxypropyl (meth)acrylate, and isobornyl (meth)acrylate may be contained, as an adhesiveness improver to metal, individually or combining two more kinds, in an amount of 10% by weight to 30% by weight with respect to the total amount of the ultraviolet curable resin composition. In a case that the content of the adhesiveness improver is less than 10% by weight, the adhesion effect is insufficient. In a case that the content of the adhesiveness improver exceeds 30% by weight, there is fear that bubbles are more likely to occur in the resin to form holes after the curing of resin, thereby losing the strength of resin.

In addition to the (meth)acrylate having the isocyanuric acid ring, pentaerythritol triacrylate, pentaerythritol tetraacrylate, dipentaerythritol penta(meth)acrylate, dipentaerythritol hexa(meth)acrylate, and dipentaerythritol polyacrylate may be contained, as a curing accelerator, individually or combining two or more kinds, in an amount of 15% by weight or less with respect to the total amount of the ultraviolet curable resin composition in order to accelerate curing speed without losing the strength and the heat resistance after the curing. In a case that the content of the curing accelerator exceeds 15% by weight, the resin composition cures so rapidly that it becomes difficult to handle the resin composition at the time of manufacture.

In addition to the (meth)acrylate having the isocyanuric acid ring, modified bisphenol A-type epoxy acrylate or bisphenol A-type epoxy modified acrylate may be contained, as a chemical-resisting agent, in an amount of 20% by weight or less with respect to the total amount of the ultraviolet curable resin composition in order to provide chemical resistance without losing the strength after the curing. Since the bisphenol A-type epoxy modified acrylate has rigidity, when the content of the bisphenol A-type epoxy modified acrylate exceeds 20% by weight, there is fear that cracks might occur in the cured resin.

In addition to the (meth)acrylate having the isocyanuric acid ring, urethane acrylate may be contained, as a toughness-adding agent, in an amount of 5% by weight or less with respect to the total amount of the ultraviolet curable resin composition in order to provide toughness. Since the urethane acrylate has superior flexibility, when the content of urethane acrylate exceeds 5% by weight, the mechanical strength may be reduced and the load capacity may be lost.

As an adjuvant or supplement for cross-linking reaction by UV irradiation of the (meth)acrylate having the isocyanuric acid ring, crosslinkable monomers may be contained individually or combining two or more kinds in an amount of 5% by weight or less with respect to the total amount of the ultraviolet curable resin composition. As the crosslinkable monomers, monomer having two or more of unsaturated bonds of an equivalent reactive property is used. Examples of the crosslinkable monomer include ethylene glycol di(meth)acrylate, propylene glycol di(meth)acrylate, butylene glycol di(meth)acrylate, hexanediol di(meth)acrylate, tetraethylene glycol di(meth)acrylate, triethylene glycol di(meth)acrylate, and tripropylene glycol di(meth)acrylate.

The resin composition related to the present invention contains the solid lubricant. It is preferred that the transmittance of ultraviolet rays be not impaired by using the solid lubricant when ultraviolet rays are radiated for curing or polymerizing the resin composition. From this viewpoint, it is used polytetrafluoroethylene resin (hereinafter referred to as "PTFE" in an abbreviated manner as appropriate) which is an organic white solid lubricant.

PTFE can be contained in an amount of 10% by weight to 50% by weight with respect to the total amount of the resin composition, and especially PTFE can be contained in an amount of 30% by weight to 50% by weight. PTFE may be in any form such as a powder form or a fibrous form, and PTFE in any form may be used individually or in combination. The particles or fibers of PTFE powder may be surface-treated such that etching is performed on a surface of particles or fibers of the PTFE powder by using sodium naphthalene and then the surface is coated with epoxy modified acrylate. Such a surface treatment enhances the affinity for acrylic resin produced from the (meth)acrylate having the isocyanuric acid ring and further strengthens the bond with the acrylic resin. Therefore, in a case that the resin composition related to the present invention is used as the self-lubricating liner, the particles or fibers of PTFE can be prevented from separating from the self-lubricating liner at the time of the sliding and thus it is possible to reduce the wear amount of the self-lubricating liner.

It is preferred that a particle diameter or a fiber length of PTFE be in the range of 75 µm to 180 µm. PTFE having such a particle diameter or fiber length is less likely to cause coagulation or aggregation even when the amount of addition of PTFE is increased, which makes it possible to increase an area ratio of PTFE existing on the resin surface after the curing and to distribute PTFE uniformly. In a case that the particle diameter or fiber length of PTFE is smaller than 75 µm, PTFE is more likely to cause the coagulation or aggregation at the time of the kneading of the resin having viscosity and PTFE might have difficulty in being distributed uniformly on the resin surface after the curing. In a case that the particle diameter or fiber length of PTFE is out of the range of 75 µm to 180 µm, the wear amount of the self-lubricating liner is relatively large.

The solid lubricant may be melamine cyanurate in addition to PTFE. In this case, the melamine cyanurate is desirably contained in an amount of 30% by weight or less with respect to the total amount of the resin composition, and the melamine cyanurate is further desirably contained in an amount of 3% by weight to 10% by weight. In a case that the content of melamine cyanurate exceeds 30% by weight, although the friction coefficient of the self-lubricating liner becomes lower, the wear amount tends to increase. The structure of melamine cyanurate is a cleavage sliding structure, such as molybdenum disulfide ($MoS_2$) and graphite, in which melamine molecules having six-membered ring structures and cyanuric acid molecules are held together by hydrogen-bonding to be arranged planarly and each of the planes is stacked in layers by weak bonding. It is presumed that such a structure contributes to the solid lubricating property.

In a case that the melamine cyanurate is used in addition to PTFE as the solid lubricant, the total content of them is desirably 10% by weight to 55% by weight with respect to the total amount of the resin composition. In a case that the content of the solid lubricants is less than 10% by weight, the friction coefficient of the self-lubricating liner becomes higher and the wear amount increases. In a case that the content of the solid lubricants exceeds 55% by weight, the strength of the self-lubricating liner becomes insufficient, which may cause plastic deformation.

The use of melamine cyanurate together with PTFE can reduce the friction coefficient of the self-lubricating liner as compared with a case in which PTFE is used individually as the solid lubricant. In special, it has been found out that the friction coefficient of the self-lubricating liner can be reduced by approximately 10%, as compared with the case in which PTFE is used individually, by making the total content of melamine cyanurate and PTFE 30% by weight to 40% by weight. Further, since the melamine cyanurate is white, even if the melamine cyanurate is added to the resin composition, no negative influence is provided on the transmittance of ultraviolet rays. Thus, the melamine cyanurate is suitable as the solid lubricant.

In order to accelerate the polymerization reaction of the (meth)acrylate having the isocyanuric acid ring with ultraviolet rays, a photopolymerization initiator is desirably contained in an amount of 0.01% by weight to 5% by weight with respect to the weight of (meth)acrylate having the isocyanuric acid ring. Examples of the photopolymerization initiator include benzophenone, 4,4-bis(diethylamino) benzophenone, 2,4,6-trimethylbenzophenone, methylortho benzoyl benzoate, 4-phenyl benzophenone, t-butyl anthraquinone, 2-ethyl anthraquinone, diethoxy acetophenone, 2-hydroxy-2-methyl-1-phenylpropane-1-one, benzyl dimethyl ketal, 1-hydroxy cyclohexyl-phenylketone, benzoin methyl ether, benzoin ethyl ether, benzoin isopropyl ether, benzoin isobutyl ether, 2-methyl-[4-(methylthio) phenyl]-2-morpholino-1-propanone, 2-benzyl-2-dimethylamino-1-(4-morpholino phenyl) butanone-1, diethyl thioxanthone, isopropyl thioxanthone, 2,4,6-trimethylbenzoyl diphenylphosphine oxide, bis(2,6-dimethoxy benzoyl)-2,4,4-trimethylpentyl phosphine oxide, bis(2,4,6-trimethylbenzoyl) phenylphosphine oxide, 2-hydroxy-1-[4-[4-(2-hydroxy-2-methylpropionyl) benzyl]phenyl]-2-methylpropane-1-one, and methyl benzoylformate. The above examples of the photopolymerization initiator may be used individually or in combination. The photopolymerization initiator, however, is not limited to these.

Glass fiber may be added to the resin composition related to the present invention in order to improve the strength of the self-lubricating liner. It is preferred that the glass fiber be added in an amount of 15% by weight or less with respect to the total amount of the resin composition. In a case that the amount of addition of the glass fiber in the resin composition exceeds 15% by weight, the wear on a surface of a mating material is more likely to be encouraged by the glass fiber which was cut at the time of the cutting and/or the grinding of the self-lubricating liner. This could compromise the advantages as the machinable liner. The use of glass fiber is advantageous in that the transmittance of ultraviolet rays is not reduced thereby.

The resin composition related to the present invention may further contain a phosphate. The phosphate improves initial conformability at the time of using the resin composition as the self-lubricating liner and can stabilize the friction coefficient early as compared with a case in which no phosphate is added. It is preferred that the phosphate be contained in an amount of 1% by weight to 5% by weight with respect to the total amount of the resin composition. The phosphate is exemplified by tertiary phosphate, secondary phosphate, pyrophosphate, phosphite, or metaphosphate, of alkali metal or alkali earth metal. In particular, the phosphate is exemplified, for example, by trilithium phosphate, dilithium hydrogen phosphate, sodium hydrogenphosphate, lithium pyrophosphate, tricalcium phosphate, calcium monohydrogen phosphate, calcium pyrophosphate, lithium metaphosphate, magnesium metaphosphate, and calcium metaphosphate.

The resin composition related to the present invention may contain fumed silica. The fumed silica is used to provide thixotropy. If the resin composition has poor thixotropy, dripping is caused when the resin composition is applied on the sliding surface, which makes the formation of liner difficult. Therefore, the fumed silica can be added to adjust the thixotropy. It is preferred that the fumed silica be contained in an amount of 5% by weight or less with respect to the total amount of the resin composition. In a case that the amount of addition of the fumed silica exceeds 5% by weight, the wear amount of the liner increases, which is not preferable.

The resin composition related to the present invention is desirably in a liquid form at room temperature. Accordingly, the resin composition can be applied on the sliding surface of the sliding member easily, and after the application, the resin composition can be cured by being irradiated with ultraviolet rays. In a case that the resin composition related to the present invention is used in the aircraft, it is preferred that the glass transition temperature (Tg) of the resin composition be 150 degrees Celsius or more in order to satisfy the requirement of heat resistance in SAE Standard AS81934 which will be described later and to ensure the heat resistance which is equivalent to or superior to that of the resin liner based on polyether ketone described in Patent Literature 3 (Japanese Patent Application Laid-open No. 2011-247408).

Depending on the application of the resin composition related to the present invention, a thermosetting agent may be further added to the resin composition, so that the secondary curing of the resin composition can be achieved by heat after the primary curing of the resin composition is achieved by ultraviolet irradiation. This cures the resin composition completely, and thereby improving the wear resistance thereof. The thermosetting agent is exemplified, for example, by organic peroxide such as diisopropyl peroxydicarbonate, benzoyl peroxide, methylethylketone peroxide, cyclohexanone peroxide, t-butyl peroxy-2-ethylhexanoate, 1,1,3,3-tetramethylbutyl peroxy-2-ethylhexanoate, t-amyl peroxy-2-ethylhexanoate, t-butylhydro peroxide, tert-butyl peroxy neodecanoate, t-butyl peroxybenzoate, cumene hydroperoxide; and azo compounds such as 2,2'-azobisisobutyronitrile and 2,2'-azobisdiethyl valeronitrile. However, the thermosetting agent is not limited to these.

In addition to the above, it is possible to add various additives such as an antioxidant, a photostabilizer, a polymerization inhibitor, and a preservation stabilizer to the resin composition related to the present invention as needed. It is desired that the total amount of addition of the additive(s) and the thermosetting agent be 5% by weight or less with respect to the total amount of the resin composition.

In the resin composition related to the present invention, the ultraviolet curable resin in the liquid form is used as a base resin. Thus, the resin composition is easily mixed with the solid lubricant including PTFE, and PTFE can be added in a high content of 30% by weight to 50% by weight. PTFE cannot be added in such a high content in a case where thermoplastic resin is used as the base resin. Therefore, it is possible to produce the self-lubricating liner having lower friction and less-wearing.

In the present invention, there is also provided a manufacturing method for producing a sliding member with a self-lubricating liner, which is obtained by applying the ultraviolet curable resin composition containing the (meth)acrylate compound having the isocyanuric acid ring represented by the following formula (1) and PTFE as the solid lubricant on the sliding surface of the sliding member and then curing the ultraviolet curable resin composition by ultraviolet irradiation. The self-lubricating liner is a machinable liner which can be subjected to after-processing through the grinding or the cutting to obtain a desired size.

The sliding member related to the present invention may be a spherical bearing provided with an outer race member having a concave first bearing surface and an inner race member having a convex second bearing surface slidably movable on the first bearing surface. In a case that such a spherical bearing is manufactured, firstly the ultraviolet curable resin composition according to an embodiment of the present invention is applied on the first bearing surface or the second bearing surface which are the sliding surfaces. Subsequently, the ultraviolet curable resin composition applied on the first bearing surface or the second bearing surface is semi-cured by being irradiated with ultraviolet rays. Thereafter, the inner race member is inserted in the outer race member and the outer race member is pressed to be plastically deformed so as to follow the convex surface of the inner race member. Then, the ultraviolet curable resin composition is completely cured by heating. Accordingly, the self-lubricating liner can be formed. In this case, it is preferred that the ultraviolet curable resin composition contain the thermosetting agent.

EXAMPLES

A resin composition and a sliding member provided with a self-lubricating liner composed of the resin composition related to the present invention will be explained based on the following examples. However, the present invention is not limited to the following examples.
<Manufacture of Ultraviolet Curable Resin Composition>

Example 1

It was prepared a resin composition in a liquid form to have the composition as shown in Table 1 by mixing ε-caprolactone modified tris-(2-acryloxyethyl) isocyanurate (A-9300-1CL, produced by Shin-Nakamura Chemical Co., Ltd.) as a (meth)acrylate compound having an isocyanuric acid ring; melamine cyanurate (MELAPUR MC25, produced by BASF Japan Ltd.) and PTFE (KT-60, produced by Kitamura Limited) as solid lubricants; 2-hydroxy-2-methyl-1-phenyl-1-propanone (DAROCUR 1173, produced by BASF Japan Ltd.) as a photopolymerization initiator; fumed silica (AEROSIL R972, produced by Nippon Aerosil Co., Ltd.); and additives. As the additives, an antioxidant, a photostabilizer, a polymerization inhibitor, and a preservation stabilizer are respectively included in small amounts. The total content of the above additives in the resin composition is shown in Table 1. However, Examples 1 to 4 further contain a thermosetting agent in addition to the above additives. An average particle diameter of PTFE was 130 μm.

Example 2

It was prepared a resin composition in a similar manner as Example 1, except that ε-caprolactone modified tris-(2-acryloxyethyl) isocyanurate, melamine cyanurate, PTFE, the photopolymerization initiator, and the additives were used in respective weight ratios (% by weight) described in columns of Example 2 of Table 1, and that 7% by weight of glass fiber (average fiber length 80 μm×average diameter φ11 μm, PF80E-401, produced by Nitto Boseki Co., Ltd.) was used instead of fumed silica.

Example 3

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 3 of Table 1.

Example 4

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 4 of Table 1, and that 5% by weight of phosphate was added.

Example 5

It was prepared a resin composition in a similar manner as Example 1, except that ε-caprolactone modified tris-(2-acryloxyethyl) isocyanurate, PTFE, the photopolymerization initiator, fumed silica, and the additives were used in respective weight ratios (% by weight) described in columns of Example 5 of Table 1 and that no melamine cyanurate was added.

Example 6

It was prepared a resin composition in a similar manner as Example 1, except that ε-caprolactone modified tris-(2-acryloxyethyl) isocyanurate, melamine cyanurate, PTFE, the photopolymerization initiator, and the additives were used in respective weight ratios (% by weight) described in columns of Example 6 of Table 1 and that no fumed silica was added.

Example 7

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 7 of Table 1.

Example 8

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 8 of Table 1 and that 30% by weight of isobornyl methacrylate (LIGHT ESTER IB-X, produced by KYOEISHA CHEMICAL Co., Ltd.) was added.

Example 9

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 9 of Table 1, and that 18% by weight of bisphenol A-type epoxy acrylate (EBECRYL3700, produced by DAICEL-CYTEC Co., Ltd.) was added.

Example 10

It was prepared a resin composition in a similar manner as Example 1, except that ε-caprolactone modified tris-(2-acryloxyethyl) isocyanurate, PTFE, the photopolymerization initiator, fumed silica, and the additives were used in respective weight ratios (% by weight) described in columns of Example 10 of Table 1; that 5% by weight of bisphenol A-type epoxy acrylate was added; that 5% by weight of dipentaerythritol hexaacrylate (A-DPH, produced by shin-Nakamura Chemical Co., Ltd.) was added; that 2% by weight of isobornyl methacrylate was added; that 15% by weight of hydroxyethyl methacrylate (LIGHT ESTER HO-250(N), produced by KYOEISHA CHEMICAL Co., Ltd.) was added; that 1% by weight of ethylene glycol dimethacrylate (1G, produced by shin-Nakamura Chemical Co., Ltd.) was added; that 7% by weight of glass fiber was added; and that no melamine cyanurate was added.

Example 11

It was prepared a resin composition in a similar manner as Example 1, except that 9% by weight of di-(2-acryloxyethyl) isocyanurate and 21% by weight of tris-(2-acryloxyethyl) isocyanurate (FA-731AT, produced by Hitachi Chemical Co., Ltd.) were respectively used instead of ε-caprolactone modified tris-(2-acryloxyethyl) isocyanurate; that PTFE, the photopolymerization initiator, fumed silica, and the additives were used in respective weight ratios (% by weight) described in columns of Example 11 of Table 1; that 6.5% by weight of bisphenol A-type epoxy acrylate was added; that 5% by weight of dipentaerythritol hexaacrylate was added; that 2% by weight of isobornyl methacrylate was added; that 15% by weight of hydroxyethyl methacrylate was added; that 1% by weight of ethylene glycol dimethacrylate was added; that 7% by weight of glass fiber was added; and that no melamine cyanurate was added.

Example 12

It was prepared a resin composition in a similar manner as Example 1, except that 37.3% by weight of di-(2-acryloxyethyl) isocyanurate (M-215, produced by TOAGOSEI Co., Ltd.) was used instead of ε-caprolactone modified tris-(2-acryloxyethyl) isocyanurate; that PTFE, the photopolymerization initiator, fumed silica, and the additives were used in respective weight ratios (% by weight) described in columns of Example 12 of Table 1; that 5% by weight of bisphenol A-type epoxy acrylate was added; that 10% by weight of hydroxyethyl methacrylate was added; that 15% by weight of glass fiber was added; and that no melamine cyanurate was added.

Example 13

It was prepared a resin composition in a similar manner as Example 1, except that 9% by weight of di-(2-acryloxyethyl) isocyanurate and 21% by weight of tris-(2-acryloxyethyl) isocyanurate were respectively used instead of ε-caprolactone modified tris-(2-acryloxyethyl) isocyanurate; that PTFE, the photopolymerization initiator, fumed silica, and the additives were used in respective weight ratios (% by weight) described in columns of Example 13 of Table 1; that 10% by weight of dipentaerythritol hexaacrylate was added; that 5% by weight of pentaerythritol triacrylate was added; that 5% by weight of isobornyl methacrylate was added; that 10.5% by weight of hydroxyethyl methacrylate was added; that 1% by weight of ethylene glycol dimethacrylate was added; that 5% by weight of glass fiber was added; and that no melamine cyanurate was added.

Example 14

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 14 of Table 1; that 10% by weight of dipentaerythritol hexaacrylate was added; that 5% by weight of isobornyl methacrylate was added; that 5% by weight of hydroxyethyl methacrylate was added; that 5% by weight of ethylene glycol dimethacrylate was added; that 5% by weight of glass fiber was added; and that 1% by weight of phosphate was added.

Example 15

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 15 of Table 1; that 10% by weight of bisphenol A-type epoxy acrylate was added; that 5% by weight of urethane acrylate (AU-3120, produced by TOKUSHIKI CO., Ltd.) was added; that 5% by weight of isobornyl methacrylate was added; that 5% by weight of hydroxyethyl methacrylate was added; that 1% by weight of ethylene glycol dimethacrylate was added; and that 5% by weight of glass fiber was added.

Example 16

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Example 16 of Table 1; that 4% by weight of bisphenol A-type epoxy acrylate was added; that 4% by weight of dipentaerythritol hexaacrylate was added; that 1.5% by weight of isobornyl methacrylate was added; that 12.5% by weight of hydroxyethyl methacrylate was added; that 1% by weight of ethylene glycol dimethacrylate was added; and that 7% by weight of glass fiber was added.

Comparative Example 1

It was prepared a resin composition in a similar manner as Example 1, except that ε-caprolactone modified tris-(2-acryloxyethyl) isocyanurate, melamine cyanurate, PTFE, the photopolymerization initiator, fumed silica, and the additives were used in respective weight ratios (% by weight) described in columns of Comparative Example 1 of Table 1.

Comparative Example 2

It was prepared a resin composition in a similar manner as Example 1, except that PTFE, the photopolymerization initiator, fumed silica, and the additives were used in respective weight ratios (% by weight) described in columns of Comparative Example 2 of Table 1; that 61.7% by weight of pentaerythritol triacrylate was added; and that ϵ-caprolactone modified tris-(2-acryloxyethyl) isocyanurate and melamine cyanurate were not used.

Comparative Example 3

It was prepared a resin composition in a similar manner as Example 1, except that PTFE, the photopolymerization initiator, fumed silica, and the additives were used in respective weight ratios (% by weight) described in columns of Comparative Example 3 of Table 1; that 66.7% by weight of pentaerythritol triacrylate was added; that 15% by weight of glass fiber was added; and that ϵ-caprolactone modified tris-(2-acryloxyethyl) isocyanurate and melamine cyanurate were not used.

Comparative Example 4

It was prepared a resin composition in a similar manner as Example 1, except that melamine cyanurate, PTFE, the photopolymerization initiator, fumed silica, and the additives were used in respective weight ratios (% by weight) described in columns of Comparative Example 4 of Table 1; that 18% by weight of bisphenol A-type epoxy acrylate was added; that 13.2% by weight of pentaerythritol triacrylate was added; that 10% by weight of urethane acrylate was added; that 10% by weight of isobornyl methacrylate was added; and that no ϵ-caprolactone modified tris-(2-acryloxyethyl) isocyanurate was used.

Comparative Example 5

It was prepared a resin composition in a similar manner as Example 1, except that 15% by weight of di-(2-acryloxyethyl) isocyanurate was used instead of ϵ-caprolactone modified tris-(2-acryloxyethyl) isocyanurate; that melamine cyanurate, PTFE, the photopolymerization initiator, fumed silica, and the additives were used in respective weight ratios (% by weight) described in columns of Comparative Example 5 of Table 1; and that 50.8% by weight of bisphenol A-type epoxy acrylate was added.

Comparative Example 6

It was prepared a resin composition in a similar manner as Example 1, except that ϵ-caprolactone modified tris-(2-acryloxyethyl) isocyanurate, PTFE, the photopolymerization initiator, fumed silica, and the additives were used in respective weight ratios (% by weight) described in columns of Comparative Example 6 of Table 1; that 25% by weight of bisphenol A-type epoxy acrylate was added; that 31.8% by weight of isobornyl methacrylate was added; and that no melamine cyanurate was added.

Comparative Example 7

It was prepared a resin composition in a similar manner as Example 1, except that PTFE, the photopolymerization initiator, fumed silica, and the additives were used in respective weight ratios (% by weight) described in columns of Comparative Example 7 of Table 1; that 46.8% by weight of dipentaerythritol hexaacrylate was added; that 5% by weight of isobornyl methacrylate was added; that 5% by weight of hydroxyethyl methacrylate was added; that 1% by weight of ethylene glycol dimethacrylate was added; that 10% by weight of glass fiber was added; and that ϵ-caprolactone modified tris-(2-acryloxyethyl) isocyanurate and melamine cyanurate were not used.

Comparative Example 8

It was prepared a resin composition in a similar manner as Example 1, except that ϵ-caprolactone modified tris-(2-acryloxyethyl) isocyanurate, melamine cyanurate, PTFE, the photopolymerization initiator, fumed silica, and the additives were used in respective weight ratios (% by weight) described in columns of Comparative Example 8 of Table 1; that 5% by weight of dipentaerythritol hexaacrylate was added; that 14.8% by weight of pentaerythritol triacrylate was added; that 10% by weight of isobornyl methacrylate was added; that 10% by weight of hydroxyethyl methacrylate was added; that 1% by weight of ethylene glycol dimethacrylate was added; and that 10% by weight of glass fiber was added.

TABLE 1

| | CTAI | DATIC | TAEIC | BEA | DPHA | PETA | UA | IBXMA | HEMA | EGDM | MC |
|---|---|---|---|---|---|---|---|---|---|---|---|
| Example 1 | 65.7 | | | | | | | | | | 5 |
| Example 2 | 59.8 | | | | | | | | | | 1 |
| Example 3 | 65.6 | | | | | | | | | | 10 |
| Example 4 | 58.8 | | | | | | | | | | 3 |
| Example 5 | 85.5 | | | | | | | | | | |
| Example 6 | 43.2 | | | | | | | | | | 5 |
| Example 7 | 46.4 | | | | | | | | | | 30 |
| Example 8 | 33.8 | | | | | | | 30 | | | 3 |
| Example 9 | 44 | | | 18 | | | | | | | 1 |
| Example 10 | 31.8 | | | 5 | 5 | | | 2 | 15 | 1 | |
| Example 11 | | 9 | 21 | 6.5 | 5 | | | 2 | 15 | 1 | |
| Example 12 | | 37.3 | | 5 | | | | | 10 | | |
| Example 13 | | 9 | 21 | | 10 | 5 | | 5 | 10.5 | 1 | |
| Example 14 | 34.3 | | | | 10 | | | 5 | 5 | 5 | 1 |
| Example 15 | 34.3 | | | 10 | | | 5 | 5 | 5 | 1 | 1 |
| Example 16 | 23.3 | | | 4 | 4 | | | 1.5 | 12.5 | 1 | 3 |
| Comparative Example 1 | 87.7 | | | | | | | | | | 1 |
| Comparative Example 2 | | | | | | 61.7 | | | | | |
| Comparative | | | | | | 66.7 | | | | | |

TABLE 1-continued

| | | | | | | | | |
|---|---|---|---|---|---|---|---|---|
| Example 3 | | | | | | | | |
| Comparative Example 4 | | 18 | | 13.2 | 10 | 10 | | 35 |
| Comparative Example 5 | 15 | | 50.8 | | | | | 1 |
| Comparative Example 6 | 10 | | 25 | | | 31.8 | | |
| Comparative Example 7 | | | 46.8 | | 5 | 5 | 1 | |
| Comparative Example 8 | 15 | | 5 | 14.8 | 10 | 10 | 1 | 1 |

| | PTFE | Photopolymerization initiator | GF | Sodium hydrogen phosphate | Fumed silica | Additives |
|---|---|---|---|---|---|---|
| Example 1 | 25 | 0.3 | | | 2 | 2.0 |
| Example 2 | 30 | 0.2 | 7 | | | 2.0 |
| Example 3 | 20 | 0.4 | | | 2 | 2.0 |
| Example 4 | 30 | 0.2 | | 5 | 1 | 2.0 |
| Example 5 | 10 | 0.5 | | | 1 | 3.0 |
| Example 6 | 50 | 0.3 | | | | 1.5 |
| Example 7 | 20 | 0.1 | | | 2 | 1.5 |
| Example 8 | 30 | 0.2 | | | 1 | 2.0 |
| Example 9 | 30 | 4.0 | | | 1 | 2.0 |
| Example 10 | 30 | 0.2 | 7 | | 1 | 2.0 |
| Example 11 | 30 | 0.5 | 7 | | 1 | 2.0 |
| Example 12 | 30 | 0.2 | 15 | | 1 | 1.5 |
| Example 13 | 30 | 0.5 | 5 | | 1 | 2.0 |
| Example 14 | 30 | 0.7 | 5 | 1 | 1 | 2.0 |
| Example 15 | 30 | 0.7 | 5 | | 1 | 2.0 |
| Example 16 | 40 | 0.7 | 7 | | 1 | 2.0 |
| Comparative Example 1 | 5 | 0.3 | | | 3 | 3.0 |
| Comparative Example 2 | 35 | 0.3 | | | 1 | 2.0 |
| Comparative Example 3 | 15 | 0.3 | 15 | | 1 | 2.0 |
| Comparative Example 4 | 10 | 0.3 | | | 2 | 1.5 |
| Comparative Example 5 | 30 | 0.2 | | | 1 | 2.0 |
| Comparative Example 6 | 30 | 0.2 | | | 1 | 2.0 |
| Comparative Example 7 | 30 | 0.2 | 10 | | 0 | 2.0 |
| Comparative Example 8 | 30 | 0.2 | 10 | | 1 | 2.0 |

CTAI: ε-caprolactone modified tris-(2-acryloxyethyl) isocyanurate
DAEIC: di-(2-acryloxyethyl) isocyanurate
TAEIC: tris-(2-acryloxyethyl) isocyanurate
BEA: bisphenol A-type epoxy acrylate
DPHA: dipentaerythritol hexaacrylate
PETA: pentaerythritol triacrylate
UA: urethane acrylate
IBXMA: isobornyl methacrylate
HEMA: hydroxyethyl methacrylate
EGDM: ethylene glycol dimethacrylate
MC: melamine cyanurate resin
PTFE: polytetrafluoroethylene resin
GF: glass fiber <Manufacture of Self-Lubricating Liner>

It was manufactured a cylindrical sleeve bearing (width (length in the axial direction) 12.7 mm, outer diameter 30.2 mm, inner diameter 24.9 mm) as shown in FIG. 1 by using a material obtained by subjecting SUS630 stainless steel to heat treatment under H1150 condition. The resin composition prepared in each of Examples 1 to 16 and Comparative Examples 1 to 8 was uniformly applied on an inner circumferential surface of this sleeve bearing by using a dispenser. Subsequently, the applied resin composition was irradiated with ultraviolet rays (λ=365 nm) for 1 minute by using an ultraviolet lamp to cure the resin composition, so that a machinable liner was formed in the inner circumferential surface of the sleeve bearing. Next, this machinable liner was subjected to the cutting and the grinding to have a liner thickness of 0.25 mm, and the sleeve was finished to the inner diameter of 25.4 mm. Then, twenty four different machinable liners composed of the resin compositions prepared in Examples 1 to 16 and Comparative Examples 1 to 8 were subjected to performance evaluation tests as follows.

<Performance Evaluation of Machinable Liner>

1. Radial Static Limit Load (Static Load Test)

Table 2 shows AS81934 standard requirements in this test. As shown in the left column of Table 2, in the AS81934 standard, the radial static limit load is defined based on the material (aluminum alloy and stainless steel) and the inner diameter size of the sleeve bearing. According to the material and the size of the sleeve bearing used in Examples 1 to 16 and Comparative Examples 1 to 8, the sleeve bearing corresponds to model No. M81934/1-16C016 described in Table 2, and thus the maximum test load was determined to be 140 kN (31, 400 lb).

TABLE 2

| Model No. | Radial static limit load (lb) | Oscillation load (lb) |
| --- | --- | --- |
| M81934/1-08A012 | 6,900 | 6,300 |
| M81934/1-08C012 | 10,800 | 6,300 |
| M81934/1-16A016 | 20,000 | 16,500 |
| M81934/1-16C016 | 31,400 | 16,500 |
| M81934/1-24A016 | 30,000 | 22,500 |
| M81934/1-24C016 | 47,100 | 22,500 |

Figure 2:
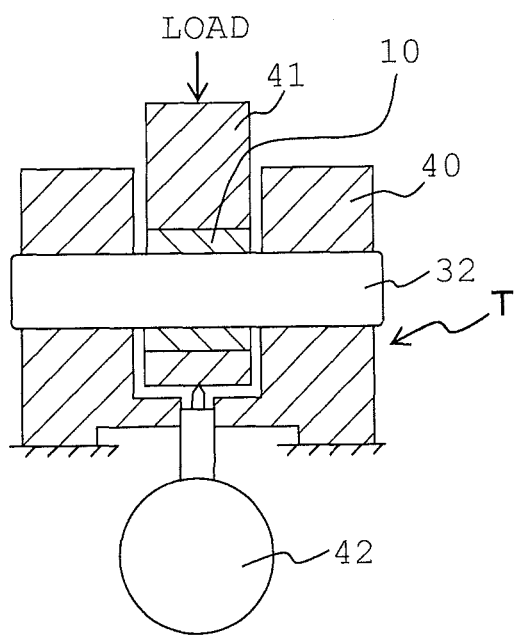
FIG. 2 shows a cross-sectional structure of a test jig in which the sleeve bearing manufactured in Examples is set.

As shown in FIG. 2, the sleeve bearing 10 is set on a test jig T first. The test jig T includes a base portion 40 having a H-shape cross section which supports a shaft member 32, a weight 41 which applies the load in the radial direction of the sleeve bearing 10 into which the shaft member 32 is inserted, and a dial gauge 42 which is provided below the base portion 40. The shaft member 32 made of carbon steel is fitted to the inner circumferential surface of the sleeve bearing 10 to apply a load in the radial direction. The load is gradually increased up to a radial static limit load value 140 kN (31,400 lb). After reaching the radial static limit load value, the load is gradually removed. The displacement is measured by the dial gauge 42 during the test, and the permanent deformation when the load is returned to zero is read from the load-displacement curve. According to AS81934 standard requirement, this permanent deformation (maximum permissible permanent deformation after applying the radial static limit load) should be 0.051 mm (0.002 in) or less. In any of the self-lubricating liners obtained from the resin compositions prepared in Examples 1 to 16 and Comparative Examples 1 to 8, the deformation under the load of 140 kN was 0.25 mm or less. Further, the permanent deformation after loading was 0.051 mm or less in any of the self-lubricating liners obtained in Examples 1 to 16 and Comparative Examples 1 to 3 and 5 to 8. However, in Comparative Example 4, the permanent deformation after loading exceeded 0.051 mm and did not satisfy the standard. The evaluation results are shown in Table 3.

TABLE 3

|  | Static load | Test at normal temperature | Test at high temperature | Oil resistance |
| --- | --- | --- | --- | --- |
| Example 1 | + | + | + | + |
| Example 2 | + | + | + | + |
| Example 3 | + | + | + | + |
| Example 4 | + | + | + | + |
| Example 5 | + | + | + | + |
| Example 6 | + | + | + | + |
| Example 7 | + | + | + | + |
| Example 8 | + | + | + | + |
| Example 9 | + | + | + | + |
| Example 10 | + | + | + | + |
| Example 11 | + | + | + | + |
| Example 12 | + | + | + | + |
| Example 13 | + | + | + | + |
| Example 14 | + | + | + | + |
| Example 15 | + | + | + | + |
| Example 16 | + | + | + | + |
| Comparative Example 1 | + | − | − | − |
| Comparative Example 2 | + | + | − | + |
| Comparative Example 3 | + | − | − | − |
| Comparative Example 4 | − | − | − | − |
| Comparative Example 5 | + | + | − | + |
| Comparative Example 6 | + | + | − | + |
| Comparative Example 7 | + | + | − | − |
| Comparative Example 8 | + | + | − | − |

(+: Meet AS81934 standard; −: Does not meet AS81934 standard)

In Example 15, urethane acrylate was contained to provide toughness to the self-lubricating liner. In order to examine a proper content of urethane acrylate in the resin composition, a resin composition obtained by further containing 5% by weight of urethane acrylate (AU-3120, produced by TOKUSHIKI CO., Ltd.) with respect to the total amount of the resin composition prepared in Example 1 and a resin composition obtained by further containing 10% by weight of urethane acrylate (AU-3120, produced by TOKU-SHIKI CO., Ltd.) with respect to the total amount of the resin composition prepared in Example 1 were prepared, respectively. Then, the self-lubricating liners obtained from the above resin compositions and the self-lubricating liner obtained from the resin composition in Example 1 were subjected to a comparative investigation regarding the permanent deformation (maximum permissible permanent deformation after applying the radial static limit load). As a result, the deformation under the load of 140 kN was 0.01 mm in the self-lubricating liner obtained from the resin composition prepared in Example 1, and the deformation under the load of 140 kN was 0.015 mm in the self-lubricating liner obtained from the resin composition containing 5% by weight of urethane acrylate. However, the deformation under the load of 140 kN was 0.052 mm in the self-lubricating liner obtained from the resin composition containing 10% by weight of urethane acrylate. Therefore, in a case that the urethane acrylate is contained in the resin composition related to the present invention, it is desirable that the urethane acrylate be contained in an amount of 5% by weight or less with respect to the total amount of the resin composition.

2. Oscillation Test Under Radial Load

An oscillation test at normal temperature and an oscillation test at high temperature of 163 degrees Celsius (+6 degrees Celsius/−0 degrees Celsius) are performed. Regarding AS81934 standard requirement in each oscillation test, the allowable upper limit values of wear amount of the liner in the oscillation test at normal temperature are 0.089 mm (0.0035 in) after 1,000 cycles, 0.102 mm (0.0040 in) after 5,000 cycles, and 0.114 mm (0.0045 in) after 25,000 cycles. The upper limit value of the wear amount in the oscillation test at high temperature is 0.152 mm (0.0060 in) after 25,000 cycles.

The sleeve bearing 10 is set on the test jig T as shown in FIG. 2, and the load of 73.5 kN (16,500 lb) according to AS81934 standard requirement as described in right column of Table 2 is applied in the radial direction and maintained statically for 15 minutes. After 15 minutes, the amount of displacement in the dial gauge 42 is set to zero and the oscillation of the shaft 32 is started. The shaft member 32 is oscillated within an angular range of ±25 degrees. The movement of the shaft member 32 going from the angle position 0 degrees to ±25 degrees and coming back to 0 degrees, and then going to −25 degrees and coming back again to 0 degrees is counted as 1 cycle. An oscillation rate should be set to 10 cycles per minute (10 CPM) or more. In the performed test, the oscillation rate was set to 20 cycles per minute. During this oscillation test, the wear amount was read from the dial gauge 42 and recorded. The wear amount after 25,000 cycles in the oscillation test at normal temperature was 0.114 mm or less in all of Examples and Comparative Examples 2, and 5 to 8. However, the wear amount in Comparative Examples 1, 3 and 4 exceeded 0.114 mm and did not satisfy the standard. The evaluation results are shown in Table 3.

The oscillation test at high temperature was performed as follows. That is, the oscillation of ±25 degrees (10 CPM or more) was performed under an oscillation load of 73.5 kN applied in a constant radial direction, while the temperatures of the shaft 32 and the liner were kept at 163 degrees Celsius (+6 degrees Celsius/−0 degrees Celsius) in the test jig T shown in FIG. 2. As a result, in all of Examples, the wear amount of the liner was 0.152 mm or less after 25,000 cycles. However, in all of Comparative Examples, the wear amount of the liner exceeded 0.152 mm and did not satisfy the standard. In Comparative Examples 6 and 8, although each of the compositions contained ε-caprolactone modified tris-(2-acryloxyethyl) isocyanurate and 30% by weight of PTFE, the wear amount of the liner did not satisfy the standard. When investigating the reason by comparison with the results of Examples 1 to 10 and 14 to 16, it is presumed that the wear amount of the liner in Comparative Examples 6 and 8 did not satisfy the standard because ε-caprolactone modified tris-(2-acryloxyethyl) isocyanurate was contained in an amount of less than 20% by weight.

3. Oil Resistance Verification Test

In this test, AS81934 standard requirement concerning the permissible upper limit value of wear amount of the liner after an oil resistance verification test is 0.152 mm (0.0060 in). The sleeve bearings 10 having a machinable liner manufactured as described above were respectively immersed in one of the six oil agents a to f cited below at 71 degrees Celsius±3 degrees Celsius for 24 hours. Then, the sleeve bearings were taken from each of the oil agents and were subjected to the oscillation test at normal temperature within 30 minutes after removal from the oil agent. Regarding oil agent b, the respective sleeve bearings were immersed at 43 degrees Celsius±3 degrees Celsius for 24 hours, and further regarding oil agent e, the condition of contact pressure was 75% of that used in the above oscillation test.

Oil agent a: Skydrol (trademark) 500B hydraulic fluid
Oil agent b: MIL-DTL-5624 turbine fuel grades JP4 or JP5
Oil agent c: MIL-PRF-7808 lubricating oil
Oil agent d: MIL-PRF-5606 hydraulic oil
Oil agent e: AS8243 anti-icing fluid
Oil agent f: MIL-PRF-83282 hydraulic fluid The results of the oscillation test after immersion in one of the oil agents for 24 hours are as follows. That is, regarding all of the oil agents, the wear amount of the liner was 0.152 mm or less after 25,000 cycles in all of Examples and Comparative Examples 2, 5, and 6; but the wear amount of the liner exceeded 0.152 mm and did not satisfy the standard in Comparative Examples 1, 3, 4, 7, and 8. The evaluation results are shown in Table 3.

4. Comparative Test of Surface Roughness of Base

Samples were prepared as described below in order to evaluate separation resistance (adhesiveness) of the self-lubricating liner to the inner circumferential surface of the sleeve bearing. Before applying the resin composition on the sleeve bearings (width: 12.7 mm, outer diameter: 30.2 mm, inner diameter: 24.9 mm) same to those used in the above tests, the inner circumferential surface of each sleeve bearing was roughened by a sandblasting process to have one of four values of surface roughness as shown in Table 4. Subsequently, the resin composition prepared in Example 1 was applied on respective inner circumferential surfaces having one of the four values of surface roughness and the inner circumferential surfaces were irradiated with ultraviolet rays, thereby forming machinable liners. Each of the machinable liners was subjected to the cutting and grinding until the thickness of the machinable liner had become 0.25 mm, and the inner diameter of each of the sleeve bearings was finished to have 25.4 mm. The sleeve bearings, each manufactured as described above to include a machinable liner formed on an inner circumferential surface having one of the four values of surface roughness, were subjected to a test according to the conditions A to D described below to verify whether there was any separation of resin.

A: It was verified whether a separation of resin occurs during the cutting process (turning process) of the sliding surface, as follows. A turning process for cutting the machinable liner at a cutting depth of 0.3 mm was performed, and it was verified whether any separation of resin during the turning process occurred.

B: It was verified whether a separation of resin occurs after keeping the sleeve bearing in liquid nitrogen (−196 degrees Celsius) for 15 minutes. The occurrence of any separation of resin was checked when the sleeve bearing was removed from the liquid nitrogen.

C: The sleeve bearing was slid under a contact pressure of 275 MPa at normal temperature in accordance with the AS81937 standard, and then it was observed whether any separation of resin occurred until completion of 25,000 cycles.

D: The sleeve bearing was oscillated under a contact pressure of 275 MPa at 163 degrees Celsius in accordance with the AS81937 standard, and then it was observed whether any separation of resin occurred until completion of 25,000 cycles.

The results of the separation test are shown in Table 4. In Table 4, "+" means that no separation was observed and "−" means that the separation was observed.

TABLE 4

| Surface roughness of base | Tests carried out | | | |
| --- | --- | --- | --- | --- |
| Ra | A | B | C | D |
| 0.2 μm | + | + | + | + |
| 1.0 μm | + | + | + | + |
| 2.0 μm | + | + | + | + |
| 4.0 μm | + | + | + | + |

+: No separation was observed
−: Separation was observed

For comparison, a resin composition containing a thermoplastic resin was used instead of the ultraviolet curable resin composing the resin composition to prepare sleeve bearings including a machinable liner formed on the inner circumferential surface having one of the four values of surface roughness, in a similar manner as the above. The resin composition containing the thermoplastic resin was obtained by mixing 70% by weight of polyether ketone, 10% by weight of PAN type carbon fiber, and 20% by weight of PTFE according to the method described in Example 1 of Japanese Patent Application Laid-open No. 2011-247408 of the applicant of the present invention. Then, the mixture was provided on the inner circumferential surface of the sleeve bearings to form a machinable liner by injection molding, and the cutting and grinding were performed until the thickness of the machinable liner had become 0.25 mm. This machinable liner was also subjected to the test of adhesiveness in a similar manner as the above. The results are shown in Table 5.

TABLE 5

| Surface roughness of base | Tests carried out | | | |
|---|---|---|---|---|
| Ra | A | B | C | D |
| 0.2 μm | − | − | − | − |
| 1.0 μm | − | − | − | − |
| 2.0 μm | − | − | − | − |
| 4.0 μm | + | + | + | + |

+: No separation was observed
−: Separation was observed

According to the results of Table 4, regarding the resin composition related to the present invention, no separation was observed in all of the cases where the surface roughness Ra ranged from 0.2 μm to 4.0 μm. On the other hand, in a case that the machinable liner was composed of the resin composition using the thermoplastic resin, it has been found out that, as shown in Table 5, sufficient adhesion force cannot be obtained unless the inner circumferential surface of the sleeve bearing is processed to have the surface roughness Ra of about 4.0 μm. Accordingly, it is understood that, the machinable liner composed of the resin composition related to the present invention can show superior adhesion force regardless of the surface roughness of the base. Further, since the self-lubricating liner is formed according to the present invention, the process for roughening the base surface is not required.

5. Effect of Particle Diameter of PTFE Powder

Figure 3:
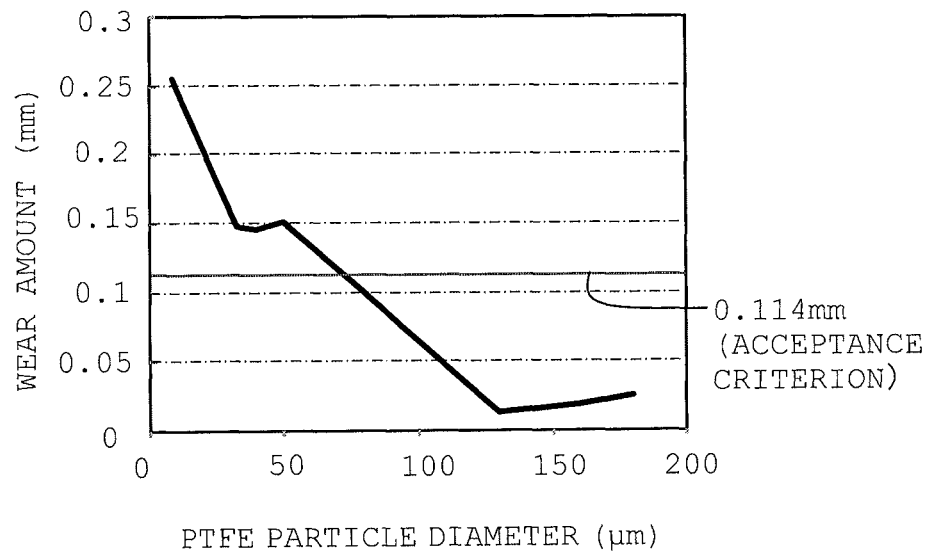
FIG. 3 is a graph showing wear amounts relative to particle diameters of PTFE powder.

In order to investigate the effect of particle diameter of PTFE powder on the wear of the liner in a case of adding PTFE powder as the solid lubricant in the resin composition, resin compositions were prepared by adding PTFE powders having different particle diameters in the resin composition of Example 1, and the oscillation test at normal temperature was carried out for respective machinable liners made from the prepared resin compositions under a contact pressure of 275 MPa up to 100,000 cycles. Then, the wear amount of each of the machinable liners was measured. The obtained results are shown in Table 6. Further, FIG. 3 is a graph showing the wear amounts with respect to the particle diameters based on the results.

TABLE 6

| Particle diameter (μm) | Wear amount (mm) |
|---|---|
| 9 | 0.255 |
| 33 | 0.148 |
| 40 | 0.146 |
| 50 | 0.151 |
| 130 | 0.013 |
| 160 | 0.018 |
| 180 | 0.025 |

As described above, the permissible upper limit value of wear amount of the liner in the oscillation test at normal temperature is 0.114 mm after 25,000 cycles. In order to follow this standard, it is understood from the graph of FIG. 3 that an average particle diameter of PTFE powder in the range of 75 μm to 180 μm is preferred. That is, in a case that PTFE powder is used, the wear resistance can be improved by using the power having an average particle diameter ranging from 75 μm to 180 μm. Further, considering the same standard, in a case that PTFE fiber is used instead of PTFE powder, it is presumed that an average fiber length is preferably in the range of 75 μm to 180 μm. Since PTFE of high molecular weight type which is burned in the manufacturing process of PTFE, for example, PTFE having a molecular weight of 1,000,000 or more has higher surface hardness, such PTFE is believed to improve the wear resistance and be suitable for the liner.

In the above Example, the tests were carried out after performing the grinding and cutting of the machinable liner to adjust the thickness of each machinable liner to 0.25 μm. In addition to this, the resin compositions prepared in Examples 1 to 15 and Comparative Examples 1 to 8 were respectively used to manufacture machinable liners having thicknesses of 0.38 mm and 0.51 mm. Then, the same tests as described above were carried out for the sleeve bearings having the liners of the different thicknesses. As a result, it has been found out that similar evaluation results are obtained.

In Examples, the resin composition related to the present invention was applied to the sleeve bearing with the shape as shown in FIG. 1. However, the application of the present invention is not limited to this shape, and it is possible to apply the resin composition related to the present invention to sliding members having a variety of shapes and structures.

<Spherical Bearing>

Figure 4:
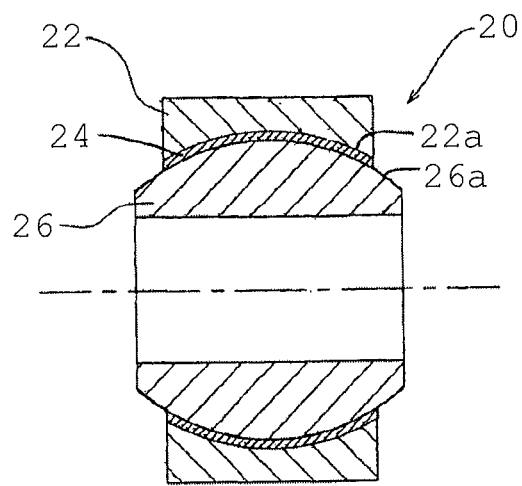
FIG. 4 is a cross-sectional view of a structure of a spherical bearing with a self-lubricating liner made from a resin composition according to an embodiment of the present invention.

As shown in FIG. 4, a spherical bearing 20 includes an outer race (outer ring) 22 having a concave spherical inner-circumferential surface 22a, an inner race (inner ring) 26 having a convex spherical outer-circumferential surface 26a, and a machinable liner 24 formed between the inner circumferential surface 22a and the outer circumferential surface 26a. The thickness of the liner may be, for example, about 0.25 mm.

Figure 5A:
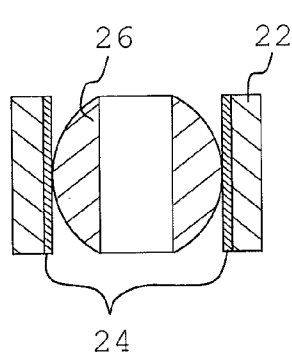
FIGS. 5A to 5C are views explaining a manufacturing process of the spherical bearing with the self-lubricating liner made from the resin composition according to an embodiment of the present invention.
Figure 5B:
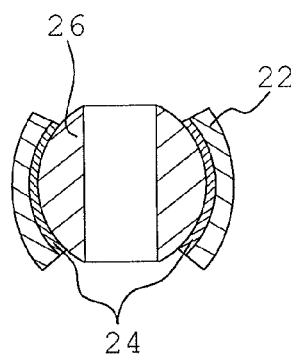
Figure 5C:
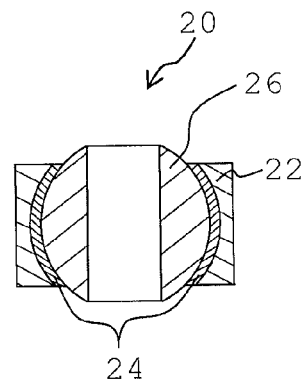

The spherical bearing 20 can be manufactured by a process using swage process, for example, as shown in FIG. 5A to FIG. 5C. At first, a resin composition 24 prepared in Example 2 was applied on the inner circumferential surface 22a of the outer race (outer ring) 22, and the resin composition was primarily cured by being irradiated with ultraviolet rays. Accordingly, the machinable liner 24 was formed. At this stage, the resin composition 24 is not completely cured. Then, the inner race (inner ring) 26 is inserted into the outer race 22 (FIG. 5A). Next, in the swage process, the outer race 22 is plastically deformed by a press so as to follow the outer circumferential surface of the inner race 26 (FIG. 5B). Next, the machinable liner 24 is cured completely by the secondarily curing of the machinable liner 24 by heat. Subsequently, the outside of the outer race 22 is finished by cutting process to complete the spherical bearing 20 (FIG. 5C).

Since the ultraviolet curable resin is used in the resin composition related to the present invention, the resin composition can be cured in a semi-cured state (primary curing), instead of being cured completely. Therefore, the resin composition in the semi-cured state after the primary curing can easily follow the deformation of the outer race in the swage process. Accordingly, it is possible to form a liner having a uniform thickness on the spherical bearing. The resin composition in the semi-cured state can be obtained by adjusting and shortening the irradiation time of ultraviolet rays to stop the polymerization reaction early. Since the liner in the semi-cured state is sandwiched between the inner race and the outer race after the swage process, the liner cannot be irradiated with ultraviolet rays after the swage process. Therefore, the secondary curing is performed by heating to completely cure the liner including the inside thereof. In this respect, it is preferred that a thermosetting agent be added in the resin composition. However, in a case that the structure of the sliding surface or the like is so that the liner can be irradiated with ultraviolet rays, the ultraviolet irradiation may be used instead of the heating. If a thermoplastic resin or a thermosetting resin is used as the resin composition, the resin does not follow the deformation of the outer race properly unless the resin is in an uncured state. In such a condition, the swage process becomes difficult to be performed.

<Rod End Spherical Bearing>

Figure 6A:
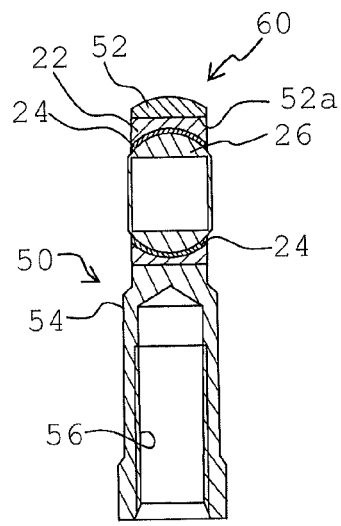
FIG. 6A is a longitudinal sectional view of a rod end spherical bearing into which the spherical bearing according to an embodiment of the present invention is incorporated and FIG. 6B is a lateral sectional view of the same.
Figure 6B:
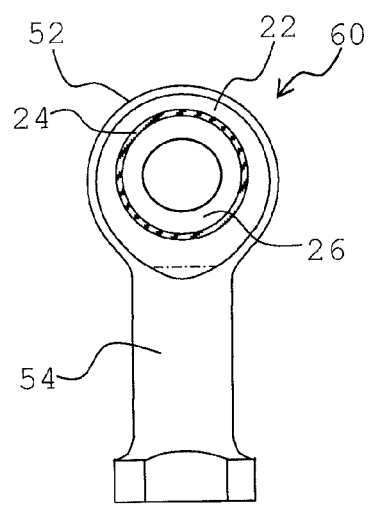

FIGS. 6A and 6B each show an exemplary rod end spherical bearing 60 in which the spherical bearing 20 is incorporated into a rod end body 50. The rod end body 50 is composed of a head portion 52 having a through hole 52a into which the spherical bearing 20 is incorporated, and a shaft portion 54 provided with a female or male thread 56. The shaft portion 54 is a body in a substantially cylindrical shape extending from the head portion 52 in a radial direction of the through hole 52a. After inserting the spherical bearing 20 in the through hole 52a, a V-shaped groove (not shown) formed at the edge of the through hole 52a is swaged, so that the spherical bearing 20 is fixed to the rod end body 50.

<Reamer Bolt>

Figure 7:
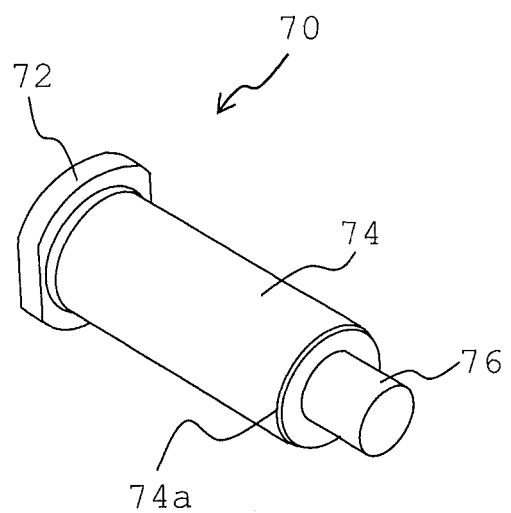
FIG. 7 is a view of an outer appearance of a reamer bolt with a self-lubricating liner, which is formed on a shaft surface of the reamer bolt and is made from the resin composition according to an embodiment of the present invention.

A reamer bolt 70 as shown in FIG. 7 includes a main body portion composed of a head portion 72, a shaft portion 74 having a large diameter and a male thread portion 76 having a small diameter, and a machinable liner 74a provided on the outer circumference of the shaft portion 74. The machinable liner 74a is formed by uniformly applying and curing a resin composition prepared in any of Examples in a similar manner as that described in Examples. The main body portion of the reamer bolt 70 is formed, for example, by SUS630. The thickness of the machinable liner 74a may be in the range of about 0.25 mm to 0.5 mm.

The reamer bolt 70 is used in important connection portions transmitting a high torque, such as a propeller shaft of vessels or ships, a flight control surface of aircraft, and a connecting rod of automobile engines. The reamer bolt 70 used in such important connection portions is required to be fitted to a bolt hole with high precision without any internal clearance. Therefore, the shaft portion 74 of the reamer bolt 70 is finished with high precision, but even so, it is advantageous that the size adjustment of the bolt can be performed at the time of assembly. Since the reamer bolt related to the present invention includes the machinable liner 74a, the user is capable of easily adjusting the size of outer diameter of the shaft portion even after curing of the resin. Further, since the reamer bolt related to the present invention includes the self-lubricating machinable liner 74a on the shaft portion 74, even when the bolt is inserted or removed at the time of assembly or disassembly, galling and the like do not occur resulting in a reamer bolt 70 with a long service life.

Although the present invention has been explained by Examples, the present invention is not limited to Examples and can be substantiated in various embodiments and aspects within the scope of the claims. For example, in the above embodiments, the self-lubricating liner is formed on an inner circumferential surface of an outer race of a spherical bearing and a rod end spherical bearing. The self-lubricating liner, however, may be formed on an outer circumferential surface of an inner race of them. Further, although the explanation has been made by citing the spherical bearing, the rod end spherical bearing and the reamer bolt as examples of the sliding member, the present invention is not limited to these and can be applied to any sliding member provided that the sliding member includes the self-lubricating liner. Especially, although the explanation has been made in the above embodiment by citing the sliding member used for the rotary motion of the member or the part, the sliding member related to the present invention includes not only that for the rotary motion but also a sliding member used for sliding motion in any direction such as translational motion (linear motion), oscillating motion, and any combination thereof.

As described above, the resin composition related to the present invention can be used as the self-lubricating liner by being applied on the sliding surface of the sliding member and being cured by ultraviolet irradiation. A process with high temperature and high pressure is not required to cure the resin composition. Further, since the adhesion of the cured resin composition to the applied surface (base surface) is extremely strong, no process is required to roughen the surface. Therefore, a relatively large amount of PTFE can be contained while ensuring the safety of work, and also the equipment cost can be reduced. The self-lubricating liner manufactured as described above can be formed in various sliding members including sliding bearings such as a sleeve bearing and a spherical bearing. By making the sliding member have the self-lubricating liner made from the resin composition related to the present invention, the surface of the liner can be subjected to the cutting, the grinding, and the like, which makes it possible to perform the fine-adjustment of inner diameter size of the bearing when the shaft is installed by an end-user. Therefore, the resin composition related to the present invention and the sliding member provided with the self-lubricating liner made from the resin composition related to the present invention are very useful in wide fields such as vessels, aircraft, automobiles, electronic products, and home electric appliances.

What is claimed is:

1. A sliding member comprising a self-lubricating liner that is formed on a sliding surface of the sliding member and is made of an ultraviolet curable resin composition comprising:
   a polytetrafluoroethylene resin as a solid lubricant; and
   a (meth)acrylate compound having an isocyanuric acid ring represented by formula (1):

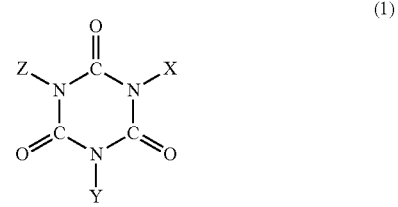

where:
   X is a group that contains an acryloyl group and is composed only of C, H, and O; and
   Y and Z are groups each composed of only C, H, and O;

wherein the (meth)acrylate compound having the isocyanuric acid ring is present in an amount of 20% by weight to 90% by weight and the polytetrafluoroethylene resin is present in an amount of 10% by weight to 50% by weight with respect to a total amount of the ultraviolet curable resin composition.

2. The sliding member according to claim 1, wherein the sliding member is a sliding bearing.

3. The sliding member according to claim 2, wherein the sliding bearing is a spherical bearing.

4. The sliding member according to claim 1, wherein the sliding member is a bolt comprising a head portion, a shaft portion, a thread portion, and the self-lubricating liner formed on an outer circumferential surface of the shaft portion.

5. A manufacturing method for producing a sliding member, comprising:
applying an ultraviolet curable resin composition on a sliding surface of the sliding member; and
curing the ultraviolet curable resin composition by irradiation with ultraviolet rays to form a self-lubricating liner,
wherein:
the ultraviolet curable resin composition comprises:
a polytetrafluoroethylene resin as a solid lubricant; and
a (meth)acrylate compound having an isocyanuric acid ring represented by formula (1):

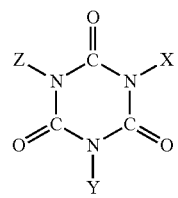

(1)

where:
X is a group that contains an acryloyl group and is composed only of C, H, and O; and
Y and Z are groups each composed only of C, H, and O; and
the (meth)acrylate compound having the isocyanuric acid ring is present in an amount of 20% by weight to 90% by weight and the polytetrafluoroethylene resin is present in an amount of 10% by weight to 50% by weight with respect to a total amount of the ultraviolet curable resin composition.

6. The manufacturing method for producing the sliding member according to claim 5, further comprising performing cutting or grinding of the self-lubricating liner to make the self-lubricating liner have a desired size.

7. The manufacturing method for producing the sliding member according to claim 5, wherein
the ultraviolet curable resin composition contains a thermosetting agent;
the sliding member is a spherical bearing including an outer race member that has a concave first bearing surface and an inner race member that has a convex second bearing surface slidably movable on the first bearing surface; and
the self-lubricating liner is formed by:
applying the ultraviolet curable resin composition on the first bearing surface or the second bearing surface as a sliding surface;
curing the ultraviolet curable resin composition applied on the first bearing surface or the second bearing surface until the ultraviolet curable resin composition is semi-cured by irradiation with the ultraviolet rays;
inserting the inner race member into the outer race member after the ultraviolet curable resin composition is semi-cured;
pressing the outer race member to cause plastic deformation so as to make the outer race member follow the convex second bearing surface of the inner race member; and
curing the ultraviolet curable resin composition completely by heat after the plastic deformation.

8. The manufacturing method for producing the sliding member according to claim 5, wherein the ultraviolet curable resin composition is applied on the sliding surface without roughening the sliding surface.

9. The sliding member according to claim 1, wherein the acrylate compound having the isocyanuric acid ring is selected from the group consisting of di-(2-acryloxyethyl) isocyanurate, tris-(2-acryloxyethyl) isocyanurate, ε-caprolactone modified tris-(2-acryloxyethyl) isocyanurate, and a mixture of the di-(2-acryloxyethyl) isocyanurate and the tris-(2-acryloxyethyl) isocyanurate.

10. The sliding member according to claim 1, wherein the acrylate compound having the isocyanuric acid ring is a mixture of di-(2-acryloxyethyl) isocyanurate and tris(2-acryloxyethyl) isocyanurate, or ε-caprolactone modified tris-(2-acryloxyethyl) isocyanurate.

11. The sliding member according to claim 1, wherein the ultraviolet curable resin composition further comprises melamine cyanurate in an amount of 30% by weight or less with respect to the total amount of the ultraviolet curable resin composition.

12. The sliding member according to claim 1, wherein the polytetrafluoroethylene resin is in a powder form having an average particle diameter ranging from 75 μm to 180 μm.

13. The sliding member according to claim 1, wherein the polytetrafluoroethylene resin is a polytetrafluoroethylene resin surface-treated by epoxy modified acrylate.

14. The sliding member according to claim 1, wherein the polytetrafluoroethylene resin is present in an amount of 30% by weight to 50% by weight with respect to the total amount of the ultraviolet curable resin composition.

15. The sliding member according to claim 1, wherein the ultraviolet curable resin composition further comprises a thermosetting agent.

16. The sliding member according to claim 1, wherein the ultraviolet curable resin composition further comprises at least one selected from the group consisting of bisphenol A-type epoxy acrylate, hydroxyethyl(meth)acrylate, isobornyl (meth)acrylate, pentaerythritol triacrylate, and dipentaerythritol hexa(meth)acrylate.

17. The sliding member according to claim 1, wherein the ultraviolet curable resin composition further comprises urethane acrylate.

18. The sliding member according to claim 1, wherein the ultraviolet curable resin composition further comprises ethylene glycol di(meth)acrylate.

19. The sliding member according to claim 1, wherein the ultraviolet curable resin composition further comprises at least one selected from the group consisting of fumed silica and glass fiber.

* * * * *